United States Patent [19]

Jones

[11] Patent Number: 5,046,587

[45] Date of Patent: Sep. 10, 1991

[54] TRAILER TONGUE WHEEL CHOCK AND SUPPORT

[76] Inventor: Duane C. Jones, 523 Spruce St., Manistee, Mich. 49660

[21] Appl. No.: 444,046

[22] Filed: Nov. 30, 1989

[51] Int. Cl.⁵ .......................... B60T 3/00; A47H 1/10
[52] U.S. Cl. ...................................... 188/32; 248/346.1
[58] Field of Search ............. 188/32, 4 R; 248/346.1, 248/188.6, 346.1, 352

[56] References Cited

U.S. PATENT DOCUMENTS

| | | | |
|---|---|---|---|
| 1,903,690 | 4/1933 | Schacht | 248/346.1 |
| 2,699,628 | 1/1955 | Aver | 248/346.1 |
| 2,931,463 | 4/1960 | Stansbury | 188/32 |
| 3,326,508 | 6/1967 | Born | 248/346.1 |
| 3,391,760 | 7/1968 | Gonser | 188/32 |

FOREIGN PATENT DOCUMENTS 1029626  5/1966  United Kingdom ............. 248/346.1

Primary Examiner—Robert J. Oberleitner
Assistant Examiner—Chris Schwartz
Attorney, Agent, or Firm—Barnes, Kisselle, Raisch, Choate, Whittemore & Hulbert

[57] ABSTRACT

A wheel chock with a base, upwardly sloped ramps extending around the periphery of the base, and a receiver located inboard of the ramps for releasably retaining a wheel and supporting the load thereon. The ramps and receiver permit wheel approach around the entire periphery of the base.

11 Claims, 1 Drawing Sheet

TRAILER TONGUE WHEEL CHOCK AND SUPPORT

FIELD OF THE INVENTION

This invention relates to a device for supporting and releasably retaining a vehicle wheel and more particularly to a wheel chock preferably for a wheel supporting a tongue of a trailer in an elevated and stationary position when the trailer is not connected to a towing vehicle.

BACKGROUND

U.S. Pat. No. 3,391,760 discloses a wheel lock block used for securing the movement of a vehicle wheel. The block is made of four pieces of angle iron arranged in a rectangle and has two wheel approaches from opposed sides.

SUMMARY OF THE INVENTION

A wheel chock device of this invention has a generally planar base, an upwardly sloped ramp surface extending around the periphery of the base, and a receiver located inboard of the ramp surface for positionally securing a wheel and supporting a load applied to the wheel, enabling wheel approach around the wheel chock's entire periphery, and releasably retaining a wheel or end pad of a tongue support. To chock the wheel of a trailer or other vehicle, the wheel is preferably rolled up the ramp surface and releasably seated within the receiver.

Objects, features and advantages of this invention are to provide a wheel chock enabling wheel approach around its entire periphery, particularly suited for releasably retaining and supporting a load from a vehicle wheel or trailer tongue independent of the land or other supporting surface angle and firmness, is lightweight, floats in water, and is simple, stable, rugged, durable, reliable, quick and easy to use, and of relatively simple design and economical manufacture.

BRIEF DESCRIPTION OF THE DRAWINGS

These and other objects, features and advantages of this invention will be apparent from the following detailed description, appended claims and accompanying drawings in which:

DETAILED DESCRIPTION

Figure 1:
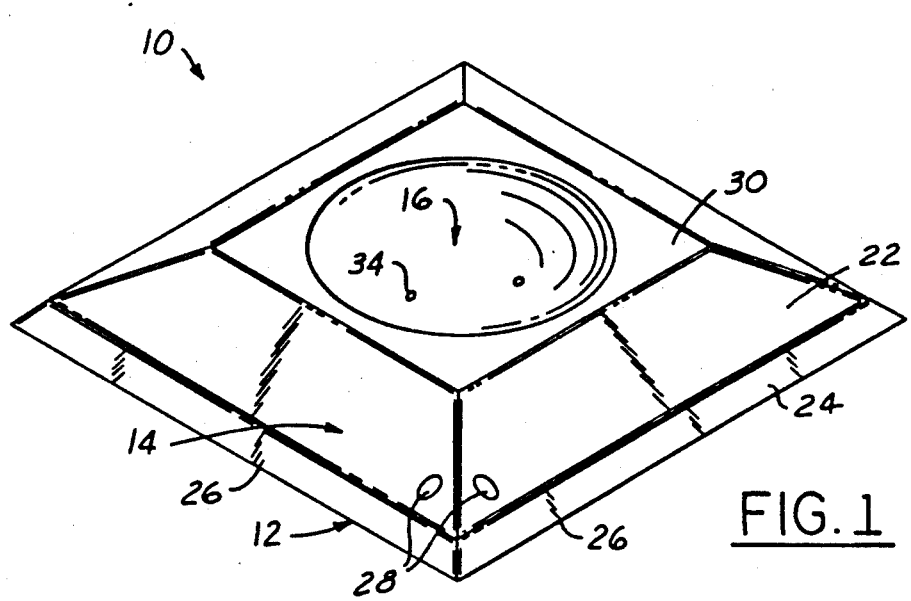
FIG. 1 is a perspective view of a wheel chock embodying this invention.

Referring in more detail to the drawings, FIG. 1 illustrates a wheel chock 10 embodying this invention with a base 12, wheel ramp 14 and a recess 16 for receiving a wheel or other support of a vehicle, trailer tongue, or the like. To enable wheel approach from all directions, the ramp 14 extends around the entire periphery of the base and is preferably formed by side wall sections 20 arranged in a generally square configuration. Preferably, each side wall has an upper ramp surface 22 on which a wheel rolls when entering or leaving the chock and a lower inclined surface 24 which retards slipping or sliding of the wheel chock on some support surfaces and soil conditions by providing a relatively sharp edges 26 at the bottom of the base. Preferably, the upper surface 22 is inclined at an acute included angle to the base in the range of about 30° to 60° and preferably 45°, and the lower surface is inclined at an acute included angle to the base in the range of about 45° to 75° and preferably 60°. If desired to facilitate attachment of a line, such as a lanyard, a pair of holes 28 can be provided through a pair of the ramp walls adjacent their juncture.

Preferably, the chock has a planar top wall 30 in which the recess 16 is disposed inwardly of the upper edge of the ramps. Preferably, the recess 16 is bowl or cup-shaped with a concave wall 32 which dips below the upper edge of the ramp. Preferably, the curved surface of the recess 16 has substantially the same radius throughout and is some portion of a sphere. Preferably, for a trailer tongue supporting wheel the radius of the curved surface is in the range of about 3 to 4 inches. If desired, one or more drain holes 34 can be provided through the wall 32 in the bottom of the recess.

Figure 2:
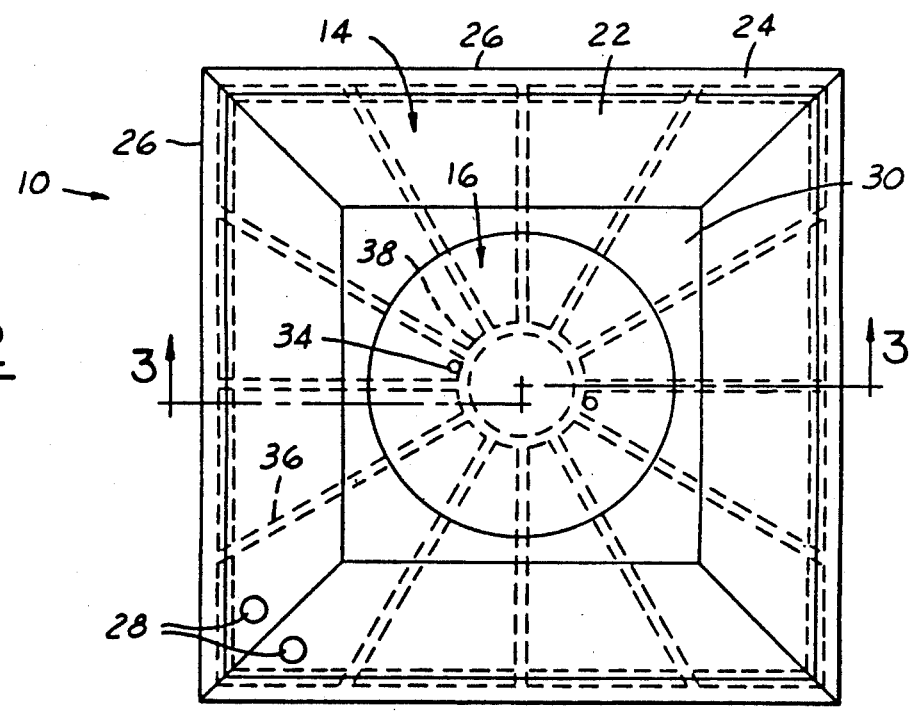
FIG. 2 is a top view showing the upwardly sloped ramp surface and receiver located inboard of the ramp surface.
Figure 3:
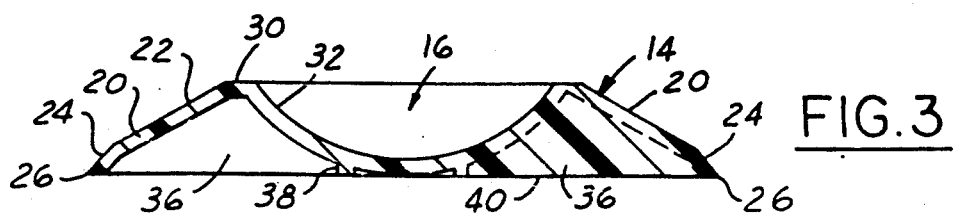
FIG. 3 is a vertical sectional view taken along line 3—3 of FIG. 2.

As shown in FIGS. 2 and 3, both the recess and ramp walls are reinforced by a plurality of underlying ribs 36 which extend generally vertically and are circumferentially spaced apart. Preferably, the ribs are connected to the walls 20, 30 & 32 throughout their adjoining edges and emanate like the spokes of a wheel from a central hub or ring 38 which underlies and is generally coaxial with the concave recess. To more uniformly distribute the load applied to the chock over the land or other support surface, the ribs, ring, and lower edge of the ramp walls all terminate in a generally flat or planar bottom surface 40 of the base. To decrease the tendency of the shock when loaded to sink or be forced into the ground or other supporting surface, preferably the total surface area of the bottom (including the central ring, ribs and outer edges of the ramp walls), is at least ⅔ and preferably in the range of 0.66 to 1.0 of the area of the concave surface of the recess 16.

Preferably, the entire wheel chock is in one unitary piece of an elastomeric material, such as plastic or rubber. So that the chock floats in water, preferably the material has a specific gravity of less than 1. Preferably, the wheel chock is made in one piece of a somewhat flexible elastomeric material, such as that sold under the trademark Kraton, G7000 Series rubber material by Shell Chemical Company of 100 W. Big Beaver Road, Suite 555, Troy, Michigan 48084. This is a tough and somewhat flexible material which has great resistance to tearing, abrasion, ultra-violet radiation, heat and ozone, and excellent weatherability.

The chock is used to restrain the movement of a wheel of a vehicle, such as a wagon or trailer, and preferably a wheel which supports the tongue of a trailer when it is disconnected from a towing motor vehicle. In use, the chock is placed on the ground or other supporting surface and the wheel is advanced by rolling on the surface at any angle to the chock. As the wheel engages the ramp, it is raised and then drops into the recess. While disposed in the recess, the wheel is retarded from further movement relative to the supporting surface. When the wheel rolls up the ramp to enter the recess, the tendency of the chock to slip or slide along its supporting surface is resisted by sharp edges 26 at the bottom which tend to resists sliding on the support surface.

I claim:

1. A wheel chock comprising, a one piece unitary body of an elastomeric material having a base, said base having a generally planar bottom surface, a ramp extending around the entire periphery of the base, said ramp having a lower portion extending around the periphery of said base and inclined to said bottom surface at an acute included angle of 45° to 75° and an upper wall portion inclined to said bottom surface at an acute included angle of 30° to 60°, said upper and lower wall portions being inclined to each other at an obtuse included angle, said ramp sloping upwardly and inwardly to provide an approach for a wheel around the entire periphery of said base, and a receiver, said receiver being inboard of the upper edge of said upper wall portion of said ramp and having a generally bowl shape and concave recess for releasably receiving a wheel and supporting the load thereon.

2. The wheel chock of claim 1 which comprises a plurality of integral spaced apart and underlying and supporting said ramp and receiver, and at least some of said ribs having a lower edge terminating in said generally planar bottom surface to distribute the load applied through a wheel received in said recess of said receiver.

3. The wheel chock of claim 1 wherein said elastomeric material has a specific gravity of less than 1.0 whereby the wheel chock can float in water.

4. The wheel chock of claim 1 which comprises a generally flat top adjacent the upper edge of said ramp, and said recess is disposed in said top.

5. The wheel chock of claim 1 having a bottom surface area to receiver surface area ratio of at least 0.66.

6. The wheel chock of claim 5 wherein said ratio is in the range of 0.66 to 1.0.

7. The wheel chock of claim 1 which also comprises an integral central support ring underlying and generally concentric with said receiver, integral ribs emanating from said central support ring and underlying and supporting said receiver and said ramp, and at least some of said ribs having a lower edge terminating in said generally planar bottom surface to distribute a load applied through a wheel received in said recess of said receiver.

8. The wheel chock of claim 7 having a bottom surface area to receiver surface area ratio of at least 0.66.

9. The wheel chock of claim 8 wherein said elastomeric material has a specific gravity of less than 1.0 whereby the wheel chock can float in water.

10. The wheel chock of claim 1 wherein said base is generally rectangular.

11. The wheel chock of claim 1 wherein said base is generally square.

* * * * *